UNITED STATES PATENT OFFICE.

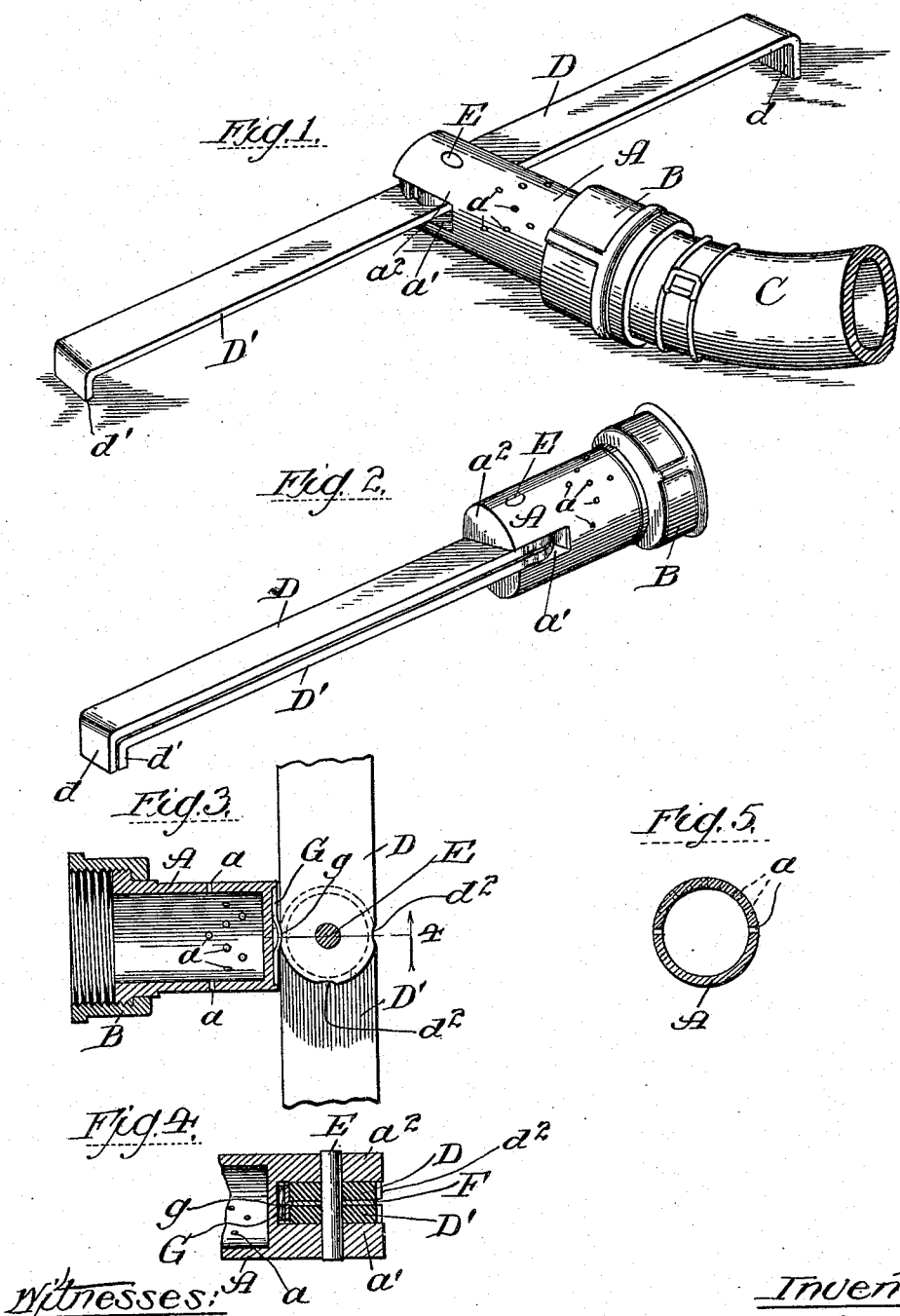

JOSEPH KEENE, OF CHICAGO, ILLINOIS.

LAWN-SPRINKLER.

No. 930,767.      Specification of Letters Patent.      Patented Aug. 10, 1909.

Application filed November 7, 1904. Serial No. 231,621.

*To all whom it may concern:*

Be it known that I, JOSEPH KEENE, a citizen of the United States, residing in Chicago, county of Cook, and State of Illinois, have invented certain new and useful Improvements in Lawn-Sprinklers, of which I do declare the following to be a full, clear, and exact description, reference being had to the accompanying drawing, forming a part of this specification.

Figure 1 is a perspective view of a lawn sprinkler embodying my invention. Fig. 2 is a perspective view of my improved sprinkler with the supports in folded position. Fig. 3 is a view in horizontal longitudinal section through the sprinkler-head, looking upward. Fig. 4 is a view in vertical section on line 4—4 of Fig. 3. Fig. 5 is a view in cross section through the sprinkler-head.

My present invention has for its primary object to provide an improved lawn sprinkler that is adapted to throw a fan-shaped body of water to an unusual distance from the sprinkler-head.

A further object of my invention is to provide a sprinkler-head with improved means for supporting it in operative position.

To this end my invention consists in the several features of improvement hereinafter described, illustrated in the accompanying drawing and particularly pointed out in the claims at the end of this specification.

In the construction of lawn sprinklers, it has been heretofore proposed to form a sprinkler-head with a plurality of discharge openings, but these have been so arranged that the streams or jets of water would coalesce immediately after issuing from the sprinkler-head. I have found that, if the discharge holes or orifices of the sprinkler-head are so disposed that the streams of water issuing therethrough are not permitted to coalesce until after they have been discharged to a considerable distance from the sprinkler-head, the water can be thrown to a much greater distance than would be possible with prior constructions in which the streams coalesce immediately after emerging from the sprinkler-head.

In the sprinkling of long and narrow strips of lawn, garden patches, or the like, it is highly desirable to provide means whereby the water shall be thrown in a fan-shaped body so as to cover the earth as far as possible at each side of the sprinkler. My present invention provides a sprinkler which in practice, and under ordinary city water pressure, will, at one setting of the sprinkler, distribute a body of water over an area about six feet wide and approximately twenty-five feet each side of the sprinkler-head.

Primarily, my invention consists in a sprinkler-head having its discharge orifices arranged in rows extending obliquely to the axis of the sprinkler-head, so that the jets of water issuing from said orifices shall in great measure avoid contacting with each other until they have emerged to a considerable distance from the sprinkler-head and have become broken up into spray.

The invention further consists in providing the sprinkler-head with laterally extending arms so as to hold the sprinkler-head in proper position, and in so connecting these arms to the sprinkler-head that in packing or shipment may be disposed into small compass.

The invention also consists in details of construction that will be hereinafter more fully set forth.

A designates my improved sprinkler-head, the inner end of which is provided with the usual swivel coupling B adapted to connect with the hose C. The sprinkler-head A is provided, around a portion of its circumference, with a plurality of discharge orifices *a* that are disposed in rows extending obliquely to the axis of the sprinkler-head A. As shown, there are four of these rows of orifices *a*, their arrangement being such as to form the outline of the letter W. By this arrangement of the orifices, which extend radially with respect to the longitudinal center of the sprinkler-head, the water is caused to issue from the sprinkler-head in a number of fine streams which, because of the arrangement of the orifices, remain distinct and separate until they have passed to a considerable distance from the sprinkler-head, when they break up into spray and coalesce, more or less, forming a fan-shaped sheet of globules extending to a considerable distance at each side of the sprinkler-head, and covering a comparatively narrow strip. Manifestly, by increasing the length of the lines of orifices *a*, the width of the fan-shaped body of spray may be varied.

In order to support the sprinkler-head A in operative position, I prefer to provide the sprinkler-head with a brace extending laterally from each side thereof; and, in the preferred form of the invention, the sprinkler-head support consists of brace arms D and D', the inner ends of which sit between the arms $a'$ and $a^2$ that project from the inner end of the sprinkler-head A and are preferably integral therewith. These arms D and D' are also preferably mounted upon a pivot pin E that passes through the arms $a'$ and $a^2$. Preferably, also, the inner ends of the arms D and D' are rounded and the arm D' made somewhat shorter than the arm D, so as to permit the downwardly turned end $d'$ of the arm D' to fold within the correspondingly downwardly turned end $d$ of the arm D, as clearly seen in Fig. 2 of the drawings.

If desired, a washer F may be interposed between the inner ends of the arms D and D', and, by preference, each of the arms D and D' have their inner ends formed with notches $d^2$ that are adapted to receive the bowed portion $g$ of a spring G that is mounted upon the outer end of the sprinkler-head A at the base of the arms $a'$ and $a^2$.

From the foregoing description it will be seen that, when the sprinkler-head and its supports are to be packed or shipped, the arms D and D' will be turned to the folded position seen in Fig. 2 of the drawings, in which position they will be frictionally held by the engagement of the spring G with the notches $d^2$ at the extreme inner ends of the arms D and D'. When the sprinkler is to be used, the arms D and D' will be turned to the extended position shown in Fig. 1 of the drawings, the notches $d^2$ at the sides of the arms D and D' at such time engaging with the bowed portion $g$ of the spring G, and serving to frictionally hold the arms D and D' in extended position. As has been stated, the sprinkler, in operation, will throw a fan-shaped body of spray at each sitting, but inasmuch as this body of spray is comparatively narrow, the attendant, without danger of becoming wet, can readily shift the sprinkler, when desired, to a new position, as the slight downward inclination of the sprinkler-head will project the body of spray in front of the attendant, even though he grasp the hose quite close to the sprinkler-head.

It is manifest that the precise details of construction above set out may be varied without departing from the scope of the invention, and that features of the invention may be employed without its adoption as an entirety.

So far as I am aware, the present invention affords the first instance of a sprinkler having a plurality of discharge orifices arranged in staggered or zig-zag line across a portion at least of the circumference of the sprinkler-head, and it is obvious that this feature may be employed in a variety of ways without departure from the invention.

Having thus described my invention, what I claim as new and desire to secure by Letters Patent, is:—

1. A sprinkler comprising a hollow head provided with means for preventing its turning when set in position for use, the upper portion of said sprinkler head being provided with a plurality of radial, divergent discharge orifices, all arranged in a zigzag line that extends transversely to the line of entrance of the water.

2. A sprinkler comprising a hollow head having a curved upper surface and provided with arms so connected to the sprinkler head as to prevent its turning when in position for use, a hose coupling connected to said sprinkler head, and the upper surface of said sprinkler head being provided with a plurality of radial, divergent discharge orifices, all arranged in a zigzag line extending circumferentially across the upper curved portion of the sprinkler head and transversely to the axis of said hose coupling.

3. A sprinkler comprising a hollow head and a pair of brace arms pivoted thereto and adapted to be extended at each side of the sprinkler head and also lengthwise thereof, said arms being so connected to the sprinkler head as to prevent its turning when the arms are extended laterally.

4. A sprinkler comprising a hollow head provided at its end with pivoted brace arms adapted to be extended laterally to support the sprinkler-head in operative position, and to be folded lengthwise of the sprinkler-head said arms being fixed to the sprinkler head to prevent its turning when the arms are extended laterally.

5. A sprinkler comprising a sprinkler-head provided at its outer end with pivoted brace-arms having downwardly turned outer ends, one of said arms being shorter than the other to permit the arms to be folded.

6. A sprinkler comprising a sprinkler-head provided at its outer end with projecting arms, and provided with brace-arms pivoted to the sprinkler-head between said projecting arms.

7. A sprinkler comprising a sprinkler-head provided at its outer end with pivoted brace arms and with a spring for frictionally holding said brace arms in extended and folded position said arms being fixed to the sprinkler head to prevent its turning when the arms are extended laterally.

8. A sprinkler comprising a hollow cylindrical head closed at one end and provided with a hose coupling at its opposite end and supporting means secured to said head for preventing its turning when set in position for use, the upper portion of said cylindrical sprinkler head being provided with a plurality of radial, divergent discharge orifices, all of said orifices being arranged in a zigzag line that extends circumferentially across said cylindrical head and transversely to the axis thereof and to the axis of said hose coupling, substantially as described.

9. A sprinkler comprising a hollow cylindrical head closed at one end, a coupling sleeve at the opposite end of said head and a pair of foldable arms pivoted to said head and arranged to prevent its turning when laterally extended for use, the upper portion of said head being provided with a series of radial, divergent discharge orifices extending in a zigzag line transverse to the axis of said head and to the axis of said coupling sleeve, substantially as described.

JOSEPH KEENE.

Witnesses:
GEO. P. FISHER, Jr.,
KATHARINE GERLACH.